United States Patent

Pinkham

[15] 3,665,100

[45] May 23, 1972

[54] AUTOMATIC COMPENSATION APPARATUS FOR THE MARKING POSITIONS OF EACH STYLUS OF A MULTISTYLII FACSIMILE RECORDER

[72] Inventor: Roger A. Pinkham, Lake Hiawatha, N.J.

[73] Assignee: EG & G, Inc., Bedford, Mass.

[22] Filed: Dec. 7, 1970

[21] Appl. No.: 95,843

[52] U.S. Cl. ........................178/6.6 R, 346/74 E, 346/74 ES, 346/139 A

[51] Int. Cl. ....................G01d 15/06, H04n 1/14, H04n 1/24

[58] Field of Search ............................178/6.6 R, 6.6 A, 7.6; 346/74 E, 74 ES, 139 A, 35

[56] References Cited

UNITED STATES PATENTS

| | | | |
|---|---|---|---|
| 2,625,458 | 1/1953 | Ruhland | 346/139 A |
| 3,108,845 | 10/1963 | Zabriskie | 346/139 A |
| 3,581,001 | 5/1971 | Sobchak | 178/7.6 |

*Primary Examiner*—Howard W. Britton

*Attorney*—Ralph L. Cadwallader and Leo M. Kelly

[57] ABSTRACT

An automatic compensation apparatus is provided whereby the marking action of each stylus of a multistylii facsimile recorder may be compensated electrically for marking in proper alignment. Delay means is included switchable into the circuit responsive to control by a shift register pulsed by means rotatable with the stylii.

10 Claims, 2 Drawing Figures

INVENTOR.
ROGER A PINKHAM
BY Edward V Connors
Attorney

AUTOMATIC COMPENSATION APPARATUS FOR THE MARKING POSITIONS OF EACH STYLUS OF A MULTISTYLII FACSIMILE RECORDER

BACKGROUND OF THE INVENTION

Facsimile systems usually include a transmitter at one location and a recorder at a spaced location connected to the transmitter by a wire or radio system. The transmitter provides a line-by-line dissection of the image of a document or photograph to be transmitted between the transmitter and the recorder. The image dissector includes a drum carrying a helical light slit which is rotatable past a fixed support carrying a straight light slit. The copy is illuminated as it is moved through the transmitter and light reflected from the copy is passed through the image dissector to a photoelectric device for conversion to an analogue type electric video signal which is transmitted to the receiver.

At the receiver a read out device converts the video signal to copy. The read out device preferably includes a plurality of stylii equally spaced on supporting means which carries the stylii transversely across a strip of recording medium while the recording medium is simultaneously moved lengthwise. The video signals are sequentially applied to each stylus as it moves across the surface of the recording medium.

Electrostatic recording paper is preferably used as the recording medium. In the recording operation the electric video signal is applied to the recorder stylii through appropriate circuitry. The stylii in a preferred embodiment are carried by a belt in equally spaced relationship. The belt is rotated at a speed such that each stylus crosses the face of the paper and marks the paper in accordance with the information in the video signal. The recording medium is continuously moved lengthwise so that the next stylus marking the next line of the recording medium has a fresh space for marking.

It is quite obvious that good copy will result only in the event each of the stylii is mechanically positioned on the belt so that the mark produced by each starts at the same distance from the edge of the recording medium or paper. For example, in the event the copy has a vertical line defining the lefthand margin thereof this line must be reproduced in the recorder as a straight line rather than as a series of dots randomly positioned to the left or the right of the optimum position. Alignment of the stylii has been accomplished heretofore by mechanical movement thereof. In such cases it is necessary to ascertain which stylus is out of line, stop the recorder, make the appropriate adjustment, and restart the recorder. Inasmuch as the stylii are carried on a rotatable supporting means difficulty has been had in ascertaining which of the stylii are producing a certain mark. In a copending application filed Dec. 7, 1970 herewith by the applicant herein, Ser. No. 95,844, titled Switching Apparatus for Each Stylus of a Multistylii Facsimile Recorder, there is disclosed switching means which make it possible to block the marks of any one or of any combination of the stylii so that in the event any stylus is making a mark out of alignment such stylus may be detected and adjustment made thereof.

The present invention goes farther than the disclosure of the above mentioned copending application by providing means whereby the marking of the stylii is automatically compensated to a certain extent without mechanically adjusting the stylii. It is of course important that the stylii be mechanically adjusted to at least a rough adjustment in advance so that the range of the electrical compensation apparatus may be within practical limits.

SUMMARY OF THE INVENTION

In accordance with the present invention an automatic compensation apparatus is provided which incorporates delay means, a shift register controlled by the delay means, and pulsing means for the shift register effective as each stylus approaches marking position into the recorder. Reset means for the shift register is operable after all of the stylii have marked their signals. Switching means is provided so that one or more of said stylii may be supplied through the delay means for compensation of the marking position of such stylii. In accordance with an amplified version of the invention a plurality of delay means may be provided and control means operative so that the delay means may be switched into the circuit during the marking period of any one of the stylii and the delay means for one stylus may be different than the delay means for any of the other stylii.

DESCRIPTION OF THE PREFERRED EMBODIMENT

Figure 1:
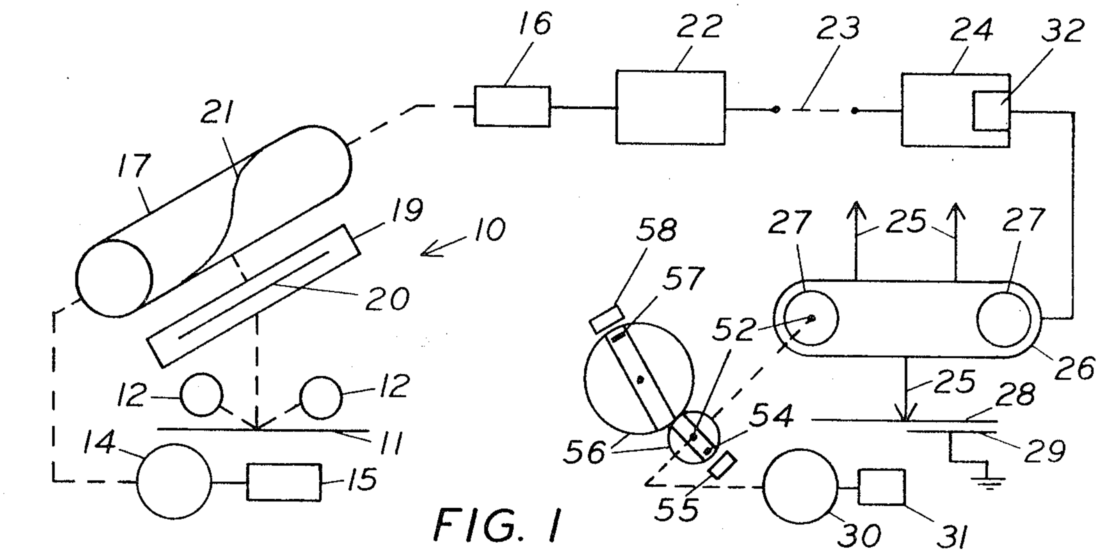
FIG. 1 is a schematic diagram illustrating a facsimile transmitter and receiver and including a compensating apparatus in accordance with the invention as part of the recorder.

Referring to the drawings there is shown in FIG. 1 a facsimile transmitter 10 with a piece of copy such as a document or photograph 11 being moved past a pair of viewing lights 12 by a motor 14 operated by a control 15. Interposed between the copy 11 and a photoelectric device 16 is a light dissector including a rotatable helix drum 17 and a fixed member 19 having a straight narrow light path 20 positioned thereon. The rotatable drum 17 has a helical light path 21 adapted to cooperate with the light path 20 so that light reflected from the copy 11 is passed to the interior of the helix drum 17 in a line-by-line image dissection manner. The helix drum 17 may be rotated by the motor 14 or may be driven separately by another motor drive. The light passed to the interior of the helix drum 17 is picked up by the photoelectric device 16 and passed through the usual transmitter electronics 22 and a transmission line 23 to usual recorder electronics 24. The output is passed to one or more equally spaced stylii 25 carried by a belt 26 passed over a pair of rollers or pulleys 27. A suitable recording medium 28, preferably electrostatic paper, is moved past the transverse path of the stylii 25 and over a grounded platen 29 by a motor 30 supplied by a control supply 31. The recording medium 28, if electrostatic paper, is then passed through a toner as is well know in the art.

In the operation of the facsimile device the copy 11 is passed by the lamps 12 so that light is reflected through the straight line path and helical line path in series to the interior of the helix drum 17. This light is picked up by the photoelectric device 16 and converted to an analog signal which is passed through transmitter electronics 22, transmission line 23 and recorder electronics 24 to one of the stylii 25. The electronics is such that a mark is made on the copy medium by the stylii 25 corresponding to a mark viewed by the image dissector drum 17.

Figure 2:
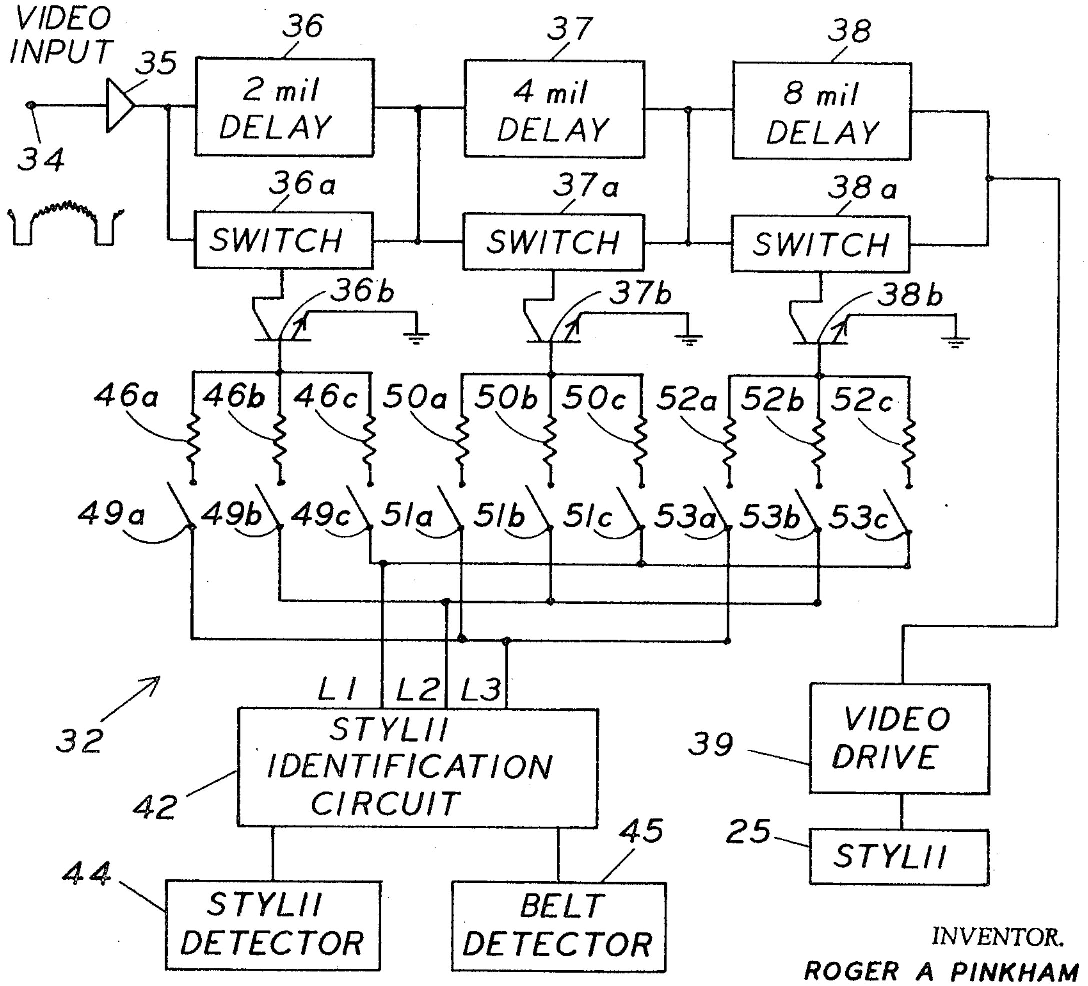
FIG. 2 is a block diagram illustrating the apparatus in accordance with the invention.

The automatic compensation apparatus in accordance with the invention is shown in block diagram in FIG. 2. The electronics of the block diagram is indicated as the block 32 in FIG. 1 indicating that the electronic circuit is incorporated in the recorder.

As stated above the purpose of the circuit is to provide compensation means so that the marking signal applied to the recording paper by one or more of the stylii is compensated to correct for an out of alignment mechanical condition of any stylii so that the mark is effectively positioned properly, and thus the marks of each of the stylii appear on the recording medium immediately under each other.

The circuit 32 is supplied a video signal at input 34 through an amplifier 35 and one or more delay circuits 36, 37 and 38 to a video drive or amplifier 39, and thence to the stylii 25. If desired a video blocking circuit may be included in accordance with the teaching of my said copending application for the purpose of blocking the operation of one or more of the stylii for observational purposes, such as for deciding whether or not additional mechanical adjustment should be provided before operating the circuit with the electrical compensating means.

Each of the delay means 36, 37 and 38 is paralleled by shorting switches 36*a*, 37*a* and 38*a*. The shorting switches in turn are controlled by delay control means such as transistors 36*b*, 37*b* and 38*b*. The delay circuits 36–38 may have different values, for example delay 36 may provide a 2-mil delay, delay circuit 37 a 4-mil delay, and delay circuit 38 an 8-mil delay. The delay control means 36*b*–38*b* are controlled by outputs of a shift register or stylus identification circuit 42. The shift register 42 in turn is switched by a stylii detector 44 and reset by a belt detector 45. The delay control transistor 36*b* has base resistors 46*a*, 46*b* and 46*c* and manually operable control switches 49*a*, 49*b* and 49*c*. The delay control transistor 37*b* has base resistors 50*a*, 50*b* and 50*c* and manually operable control switches 51*a*, 51*b* and 51*c*. The delay control transistor 38*b* has base resistors 52*a*, 52*b* and 52*c*, and manually operable control switches 53*a*, 53*b* and 53*c*.

The stylus detector 44 may be any suitable switching means adapted to produce a pulse responsive to the passage of the stylii past a fixed point. Conveniently in the event the belt 26 is rotated by the pulley 27 carried by a shaft 52 and so designed that the pulley makes three revolutions of the belt 26; a magnetic slug 54 may be carried by the pulley shaft 52 and rotatably moved by a reed switch 55 fixed to the frame. Suitable pulsing means in the stylus detector 44 will be switched by the reed switch 55. Thus the rotation of the pulley 27 will control the output of the stylii detector 44 so that a pulse is produced for each rotation of the pulley 27 and, of course, it will be produced when one of the stylii 25 is in a fixed marking position. Suitable adjustment of the rotatable position of the magnetic slug 54 with respect to the reed switch 55 is made so that the pulse is produced shortly after the stylus 25 has passed the edge of the recording paper.

In order to provide control means for the belt detector or reset 45 a suitable reduction gear means 56 is provided controlled by shaft 52 of pulley 27. The gear reduction means 56 also carries a magnetic slug 57 cooperating with another reed switch 58 to control the belt detector or reset 45 so that a reset pulse is given to the shift register 42 for each rotation of the belt 26.

In the operation of the apparatus in accordance with the invention suitable pulses are applied to the shift register or stylus identification circuit 42 indicating the approach of a stylus 25 to the marking edge of the paper. One or more of the various switches 49*a*, 49*b*, 49*c*, or 51*a*, 51*b*, 51*c*, or 53*a*, 53*b*, 53*c*, is closed so as to provide an appropriate delay in the video signal applied to the input 34. The delay is applied to the entire line of scan marked by each of the stylii 25. Generally it is possible to manipulate the switches and view the recorded copy to ascertain whether or not a greater or less delay is required for proper alignment of the mark produced by the various stylii. Of course in the event it is found that the delay required is beyond the scope of the available adjustment it is necessary that mechanical adjustment of the stylii be made to bring them within the operational range of the compensating apparatus.

While the invention has been described and illustrated with reference to a specific embodiment thereof it will be understood that other embodiments may be resorted to without departing from the invention. Therefore, the invention set out above should be considered as illustrative and not as limiting the scope of the following claims.

We claim:

1. An automatic compensation apparatus for the marking position of each stylus of a multistylii facsimile recorder comprising means adapted to provide a marking signal, delay means for said marking signal, control means for said delay means, a shift register, pulsing means for said shift register effective as each stylus approaches marking position in the facsimile recorder, reset means for said shift register effective after all of said stylii have marked their signals, circuit means connecting said shift register outputs for operating said control means for said delay means, and switching means rendering said circuit means selectively ineffective so that one or more of said stylii may be supplied through said delay means for the compensation of the marking position of that one or more stylii.

2. An automatic compensation apparatus according to claim 1 in which said control means for said delay means includes a shorting switch, and connection means for said switch across said delay means.

3. An automatic compensation apparatus according to claim 1 in which said pulsing means for said shift register includes a stylii detector magnetic slug carried with said stylii, a stylii detector reed switch is included operated by said magnetic slug, and means is included for operating said stylii detector magnetic slug for each marking operation of each stylus.

4. An automatic compensation apparatus according to claim 1 in which said reset means includes a belt detector magnetic slug carried with said stylii, a belt detector reed switch is included operated by said magnetic slug, and means is included for operating said belt detector magnetic slug once for each operation of all of said stylii.

5. An automatic compensation apparatus according to claim 1 in which said switching means includes a manually operable switch for each output of said shift register.

6. An automatic compensation apparatus according to claim 1 in which is included a plurality of delay means, a shorting switch is provided for each means, control means is provided for each shorting switch operative by the outputs of said shift register, and switch means is provided in each output of said shift register so that one or more of said shorting switches is operable during the marking period of each of the plurality of stylii.

7. An automatic compensation apparatus according to claim 1 in which is included a plurality of delay means.

8. An automatic compensation apparatus according to claim 7 in which said delay means provide differing values of delay.

9. An automatic compensation apparatus according to claim 1 in which is included a plurality of delay means, said delay means provide differing values of delay, said pulsing means for said shift register includes a stylii detector magnetic slug carried with said stylii, a stylii detector reed switch is included operated by said magnetic slug, means is included for operating said stylii detector magnetic slug for each marking operation of each stylus, said reset means includes a belt detector magnetic slug carried with said stylii, a belt detector reed switch is included operated by said magnetic slug, and means is included for operating said belt detector magnetic slug once for each operation of all of said stylii.

10. An automatic compensation apparatus according to claim 9 in which said switching means includes a manually operable switch for each output of said shift register, a plurality of delay means is included, a shorting switch is provided for each delay means, delay control means is provided for each shorting switch operative by the outputs of said shift register, and switch means is provided in each output of said shift register so that one or more of said shorting switches is operable during the marking period of each of the plurality of stylii.

* * * * *